Dec. 13, 1927.
M. E. FRASIER
1,652,664
LICENSE PLATE HOLDER
Filed April 28, 1926
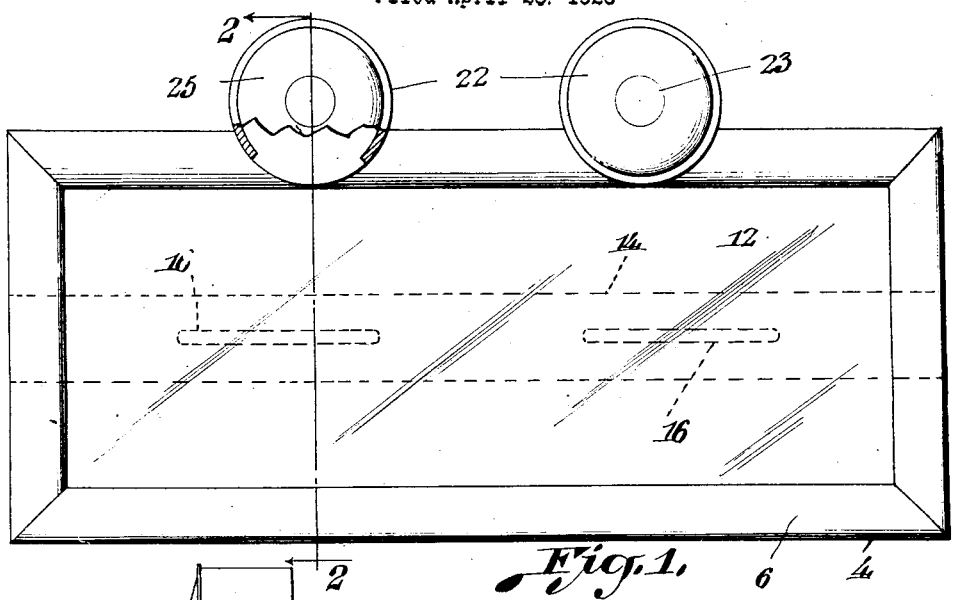
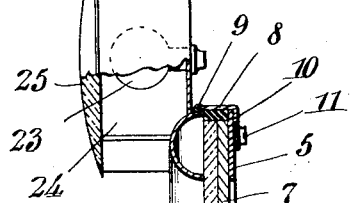
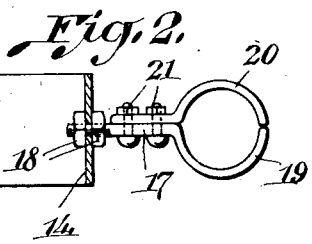
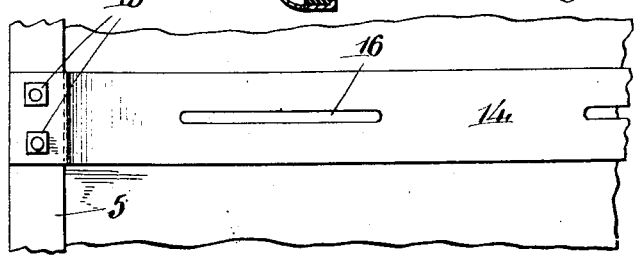

Patented Dec. 13, 1927.

1,652,664

UNITED STATES PATENT OFFICE.

MARION E. FRASIER, OF CORINTH, NEW YORK, ASSIGNOR OF ONE-HALF TO JOHN H. PITKIN, OF CORINTH, NEW YORK.

LICENSE-PLATE HOLDER.

Application filed April 28, 1926. Serial No. 105,195.

This invention relates to license plate holders, being adaptable particularly to motor vehicles.

The primary object of the invention is to provide a holder for license plates which shall be of simple construction, which may be manufactured and marketed at low cost, which enables the license plates to be easily applied to or removed from the holder, which maintains the license plates in such position as to be readily observed or viewed, which protects the license plate against discoloration or being obscured due to snow, ice, dust or dirt, which maintains the license plate so that no moisture or water may gain access thereto, and which is equipped with improved means for illuminating the indicia carried by the plate.

A still further object is to provide a plate holder of the character stated which may be easily and quickly applied to the motor vehicle, and is adaptable to both the front and rear ends thereof.

A still further object of the invention is the provision of improved means for the attachment of the plate holder to the vehicle.

With these objects in view, together with others which will appear as the description proceeds, the invention consists in the novel construction, combination and arrangements of parts, all as will be described more fully hereinafter, illustrated in the drawings and particularly pointed out in the claims.

In the drawings:

Fig. 1 is a front elevation, parts broken away, of a license plate holder constructed in accordance with the invention, Fig. 2 is a vertical sectional view taken substantially upon line 2—2 of Fig. 1, and Fig. 3 is a fragmentary rear elevation of the improved holder illustrating the means employed for securing the same to the vehicle.

Referring now more particularly to the drawing, 4 represents generally the holding frame, and this frame will be of such length and breadth as to properly hold and maintain the license plate for the purposes of display. The frame comprehends generally a rectangular metallic rim represented at 5, the latter constituting the rear portion thereof, and this rim is shaped so as to present a channel between itself and the forwardly rolled or curved portion or beading 6. This beading may be of the same width as the portion 5, or may be narrower than the same, as may be desired or required. The metallic frame thus constructed presents a rectangular central opening, and the frame may be constructed of one piece or a number of sections properly fitted and secured together. Furthermore, the frame may be finished in any desired manner, and is preferably nickel plated so as to render the same rust proof and at all times present a neat appearance.

The upper longitudinal edge of the frame is cut away in order that the license plate represented at 7 may be inserted therein, and this cut away portion is opened or closed by a lid or cover plate denoted at 8. This cover, in the present instance, is hinged to the frame as at 9, and at its free end presents a down-turned portion 10 to engage over the rear portion 5 of the frame, and screws, bolts or other retaining means indicated generally at 11 may be employed to secure the cover in closed position.

The channel between the portions 5 and 6 of the frame is of sufficient width to accommodate both the license plate 7 and a glass covering therefore indicated at 12, and it is preferred that the said cover be of the same size as the license plate. To insure a tight fit of both the glass and the license plate within the channel and to maintain the same tight therein and weatherproof, a gasket or packing 13 of rubber, felt or other material is provided, and this packing may extend entirely around the frame. In addition to rendering the interor of the frame weather proof, this packing holds the glass and plate against rattling and in snug position at all times.

To secure the frame to the motor vehicle or other support, a strip of metal 14 is employed. This strip extends longitudinally and centrally across the back of the frame and is secured at its ends as by bolts or screws 15 to the rear portion of the frame. The middle portion of this strap is spaced outwardly beyond the rear of the frame, and is provided with spaced longitudinally disposed slots 16 for the reception of elements employed to retain the frame upon the vehicle.

One means is illustrated in securing the frame to the vehicle, and this includes bolt shanks 17, threaded at one end and having the said end extending through the slots 16.

Locking nuts 18 are threaded upon the shank and tightened upon opposite sides of the strap 14, whereby to securely hold the shanks to the strap and projecting rearwardly therefrom. The rear ends of these shanks are deflected or made in semi-circular shape as represented at 19, and companion sections 20 bolted as by bolts 21 to the shanks cooperate with the portions 19 to provide clamps for securing the shanks to rods or bars usually provided upon the motor vehicle for securing license plates thereto. It will be understood, however, that the particular type of motor vehicle with which the frame is to be used may not be adaptable to the specific means for securing the plate holder thereto, and in such instances the specific devices herein disclosed may be dispensed with and others used in their stead.

Associated with the plate holder are illuminating devices, and these comprise a pair of housings represented at 22 and spaced proper distances apart upon the upper margin of the frame. These housings are of substantially cylindrical formation and contain incandescent electrical lamps 23 energized from the usual source upon the vehicle. The lower portions of these housings are apertured as at 24, so that the light rays within the housing will be projected downwardly and directly upon the display face of the frame. If desired, the rear ends of these housings may be provided with colored lenses 25. It is preferred that the housings be spaced apart such distances that the rays of light projected therefrom will brilliantly illuminate all parts of the license plate held within the frame behind the glass plate 12.

From the foregoing it is obvious that I have provided a holder for the license plates of vehicles which is of extremely simple construction, and which is justly capable of performing the various functions to which it is ascribed. It is apparent that the removal of old license plates and insertion of new ones is generally facilitated by the construction above described, and the protective feature of the frame and the glass plate 12 insures the proper display of the license plate at all times. Furthermore, by covering the license plate with the glass 12, cleaning of the same is greatly facilitated, as it is at once appreciated that the wiping off of the smooth glass surface with a cloth or sponge effectively eliminates matter adhering thereto.

While the above is a description of the invention in its preferred embodiment, it is apparent that variations in the minor details of construction, the assemblage and arrangement of parts may be resorted to without departing from the spirit of the invention as defined by the claims.

Having thus described my invention, I claim:

1. In a holder for license plates, a frame providing spaced rear and fore portions providing a channel between the same, the said frame cut away at one edge to provide an opening communicating with said channel, a cover for said opening, a glass plate for insertion within said channel through said opening, and a packing strip within said channel extending entirely around the same interposed between the edge of the glass and the adjacent portions of the frame.

2. In a holder for license plates, a frame of retangular formation providing a central opening and a channel co-extensive with the frame, a part of the frame cut away to provide an opening entering into said channel, a cover for said opening, the forward portion of said frame being curved and providing an element projecting toward said channel, a plate for insertion within said channel and to be engaged by said projecting portion of the frame, and means for securing said frame to a support.

In testimony whereof I affix my signature.

MARION E. FRASIER.